United States Patent [19]
Ghere

[11] 3,824,404
[45] July 16, 1974

[54] VEHICLE POWER OUTPUT MEANS

[76] Inventor: Leonard R. Ghere, 256 S. Florence, Wichita, Kans. 67209

[22] Filed: Apr. 3, 1973

[21] Appl. No.: 347,434

[52] U.S. Cl. ............................................. 307/10 R
[51] Int. Cl. ............................................. H02j 1/00
[58] Field of Search ................................. 307/10 R

[56] References Cited
UNITED STATES PATENTS

| | | | |
|---|---|---|---|
| 3,471,706 | 10/1969 | Schneider | 307/10 R |
| 3,497,709 | 2/1970 | Chilton et al. | 307/10 R |
| 3,586,868 | 6/1971 | Martens et al. | 307/10 R |
| 3,655,991 | 4/1972 | Schneider | 307/10 R |
| 3,660,671 | 5/1972 | Peterson | 307/10 R |
| 3,676,694 | 7/1972 | Schneider et al. | 307/10 R |

Primary Examiner—William M. Shoop, Jr.

[57] ABSTRACT

This invention relates to a power output means for conversion of the regulator alternator electrical system of a vehicle to supply electrical power for the operation of lighting fixtures, hand tools, etc. The power output means is connected to the normal vehicle ignition means being a battery power supply, ignition switch, an alternator, an a regulator with the invention herein being a power converter means including a master switch means connected to a voltage control assembly and a current control assembly to achieve a power output at an output receptacle whereby the invention is operable to control the voltage and amperage output regardless of the vehicle engine speed.

10 Claims, 3 Drawing Figures

VEHICLE POWER OUTPUT MEANS

In the prior art, it has been recognized that a power supply can be achieved from the output of an electrical power generator system or present day vehicles to operate power tools and lighting fixtures above the normal vehicle voltage output. Therefore, the prior art teaches the use of an electrical generator system of a vehicle for operating tools and fixtures on D.C. power and utilizes the alternator and power therefrom. However, in the prior art systems, there has been a problem whereby variation in engine speeds changes the D.C. voltage output and the high voltage damages the tools or other instruments being powered. Some of the prior art devices have utilized complicated and expensive systems in order to control the engine speed so as to maintain the desired voltage output.

In one preferred embodiment of this invention, a vehicle power output means is provided mountable on any vehicle structure utilizing an alternator and regulator system. More particularly, the power output means includes a vehicle ignition means and a power converter means operably connected to the ignition means. The vehicle ignition means includes a standard available electrical system being 1) a power supply, normally a 12 volt battery; 2) an ignition switch connected to the power supply; 3) an alternator member to generate a power output; and 4) a regulator member connected to the alternator member so as to regulate the power supply therefrom for charging the battery. The power converter means is mounted within a housing means and includes a master switch, a voltage control assembly, a current control assembly; and an output receptacle member. The master switch is a three pole, two position switch having 1) a position being a normal 12 volt operating position; and 2) another position is the production of a 90 volt D.C. power output available at the receptacle member. The voltage control assembly is provided with a resistor member, a solenoid member, and an indicator light being operable so as to maintain the voltage output between 80 and 110 volts D.C. and preferrably at 90 volts D.C. Similarly, the current control assembly is operable so as to regulate the output current between 20 – 30 amperes and preferrably at 25 amperes to prevent damage to tools, etc. utilizing the same.

One ojbect of this invention is to provide a power output means which can be attached to the electrical system of a vehicle and operable to produce a controlled voltage and current output regardless of the engine speed which may be utilized when traveling on the highways.

Another object of this invention is to provide a power output means including a power converter means mountable in a compact housing structure which can be readily attached to the vehicle ignition means and having a master switch member whereupon you have the choice of a normal 12 volt output or a 90 volt output for operating various tools, etc.

Still, another object of this invention is to provide a power convertr means operable with the ignition system of a vehicle so as to convert power from the alternator member to 80 – 110 volt D.C. power output for operating power tools, lighting fixtures, and the like.

Still, another object of this invention is to provide a power output means having a power converter means with a voltage control assembly and a current control assembly operable to maintain the D.C. voltage and current output within acceptable limits so that no damage results to tools utilizing the power output from variations of engine speed.

One further object of this invention is to provide a power output means having a power converter means which may be readily attached to a dashboard of a vehicle and readily connected to the available vehicle ignition means with such power converter means being easy to install, reliable in operation, and substantially maintenance free.

Various other objects, advantages, features of the invention will become apparent to those skilled in the art from the following discussion, taken in conjunction with the accompanying drawings, in which.

Figure 1:
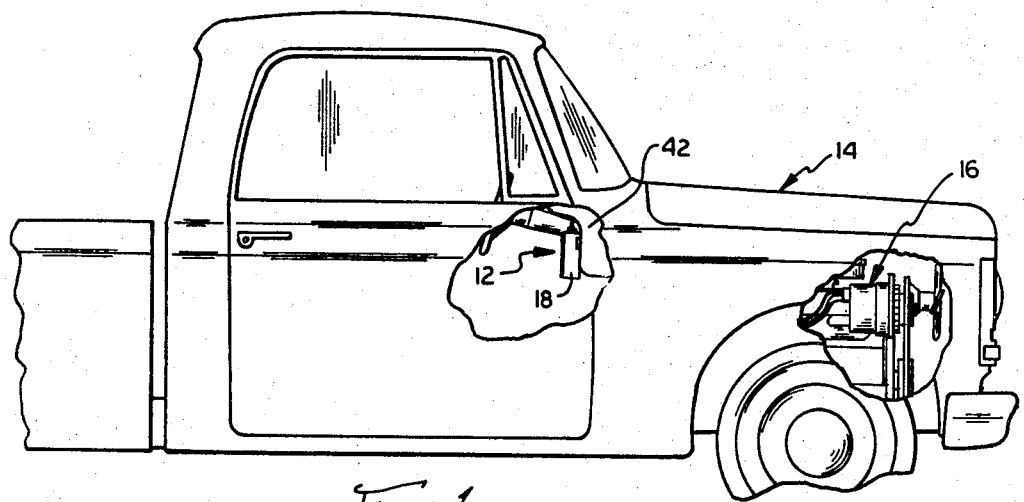
FIG. 1 is a fragmentary side elevational view of a vehicle having portions thereof broken away to show the power output means of this invention.

The following is a discussion and description of preferred specific embodiments of the vehicle power output means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and, in particular to FIG. 1, the power output means of this invention, indicated generally at 12, is shown as mounted within a pick-up truck vehicle 14. The power output means 12 includes a vehicle ignition means 16 having a power converter means 18 connected thereto.

The vehicle ignition means 16 is substantially available on all vehicles utilizing the power converter means 18 of this invention and includes 1) a power supply means 20; 2) an ignition switch member 22; 3) an alternator member 24; and 4) a regulator member 25. The power supply means 20 is normally a conventional 12 volt storage battery 27 for operating the vehicle ignition means 16. The ignition switch member 22 is of a substantially conventional nature being a key operated member to provide the power from the battery 27 for energizing the ignition circuit. The alternator member 24 may be one of numerous types such as Delco-Remy alternator, Ford "Autolight," Motorola alternator, Delco "Delcotron," and various types thereof. The regulator member 25 is of a standard or a solid state type operably connected to the alternator member 24 and the battery 27. The regulator member 25 operates to supply the proper voltage to the battery 27 during power generating periods.

Figure 3:
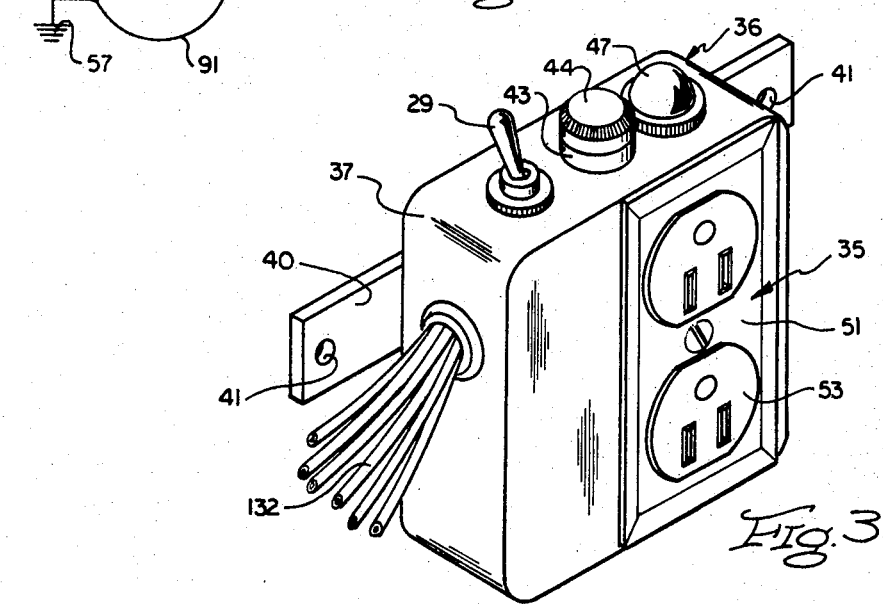
FIG. 3 is a perspective view illustrating a power converter means within a housing means of the power output means of this invention.

The power converter means 18 includes a master switch member 29, a voltage control assembly 31, a current control assembly 33, and an output receptacle member 35; all which can be compactly mounted within a housing means 36 as shown in FIG. 3. More particularly, the housing means 36 includes a housing member 38 secured to a mounting bracket 40 having a pair of holes 41 therein for mounting to a dashboard member 42 as shown in FIG. 1. The housing member 38 supports the master switch member 29, a fuse housing 43 having a removable cap member 44 for removing a fuse member 45 therein, an indicator light 47, and the output receptacle member 35. The output receptacle member 35 is shown having a face plate 51 covering a plug fixture 53 for receiving a plug member (not shown) to transfer the 90 volt D.C. output to power tools or the like.

Figure 2:
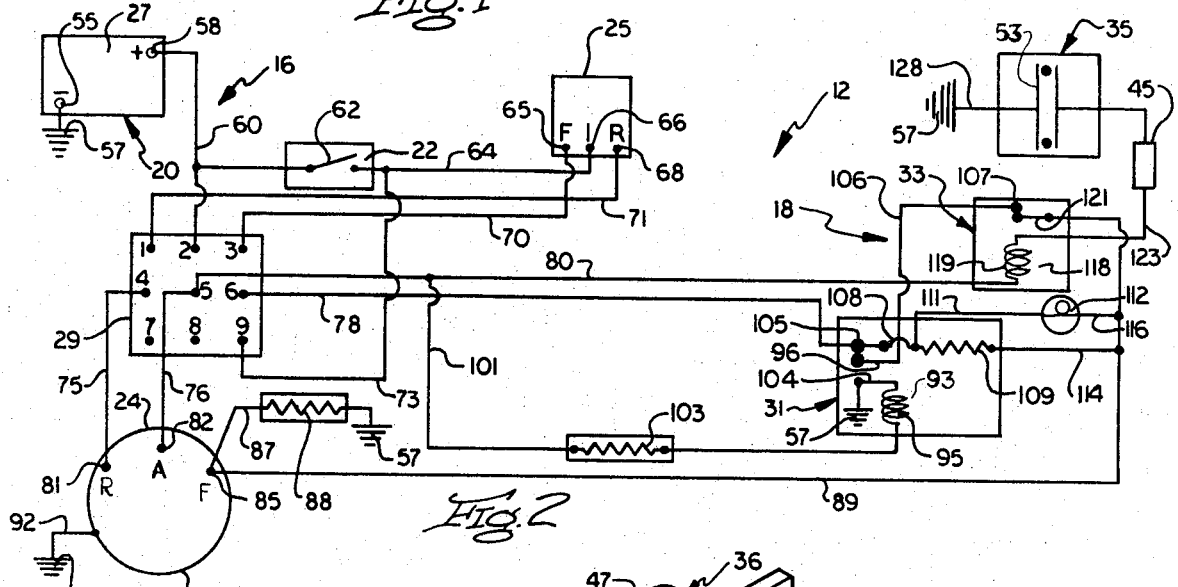
FIG. 2 is a schematic diagram illustrating the electrical circuit of the power output means of this invention.

Referring to the electrical circuit in FIG. 2, the battery 27 is provided with a negative pole 55 connected to ground 57 and a positive pole 58 connected by a line 60 to the ignition switch member 22. The ignition switch member 22 is shown with a lever 62 which may be closed by a key member to supply current through a line 64 to the regulator member 25. The line 60 from the battery 27 is also connected to the master switch member 29.

The master switch member 29 is a three pole, two position type whereupon poles 1, 2, and 3 are connected to respective poles 4, 5, and 6 in the first position and the poles 4, 5, and 6 are connected to respective poles 7, 8, and 9 in the second position. The first position is for normal 12 volt operation and the second position is for the 110 volt D.C. power output.

The regulator member 25 includes a field terminal 65, an ignition terminal 66, and a relay terminal 68. The field terminal 65 is connected by a line 70 to pole 3 on the master switch member 29. The relay terminal 68 is connected by line 71 to pole 1 and the ignition terminal 66 is connected to the line 64 to the ignition switch member 22 and by interconnected line 73 to pole 9 on the master switch member 29.

On referring to the master switch member 29 in FIG. 2, pole 2 is connected to line 60, pole 4 and 5 are connected by respective lines 75 and 76 to the alternator member 24, pole 6 is connected by a line 78 to the voltage control assembly 31, pole 5 is connected by a line 80 to the current control assembly 33, and poles 7 and 8 are open.

The alternator member 24 includes a relay terminal 81 connected to line 75; an armature terminal 82 connected to line 76; a field terminal 85 connected by a line 87 through a resistor 88 to ground 57 and by a line 89 to the current control assembly 33; and a housing 91 of the alternator member 24 is connected by line 92 to ground 57.

The voltage control assembly 31 includes a vibrator type, relay member 93 having a coil member 95 operable to move a contact lever 96 under certain voltage conditions to be explained. The line 80 is connected by a line 101 having a resistor member 103 therein and connected to the coil member 95. The coil member 95 is connected by a line 104 to ground 57. The line 78 from pole 6 is connected to contact 105 which is normally connected to the contact lever 96 which, in turn, is connected by a line 106 to a contact 107 in the current control assembly 33. The contact 105 is further connected by a line 108 to a resistor member 109 and through a line 111 to an indicator light 112.

The resistor member 109 is in parallel with the indicator light 112 which are connected by respective lines 114 and 116 to the line 89.

The current control assembly 33 includes a vibrator type, relay member 118 having a coil member 119 and a contact lever 121. The line 80 from pole 5 is connected to one side of the coil member 119 and a line 123 from the coil member 119 is connected through the fuse member 45 to the receptacle member 35. The contact lever 121 is normally closed and connected to contact 107. The receptacle member 35 includes the plug fixture 53 having one side connected to the line 123 and the other side connected by a line 128 to ground 57.

In use and operation of the power output means 12 of this invention, the housing means can be readily mounted on the dashboard of the pick-up truck vehicle 14 through the use of the bracket member. Thereupon, the numerous electrical lines, indicated at 132, can be attached to the various portions of the vehicle ignition means 16 as shown in FIG. 2.

The master switch member 29 is of a three pole, two position type having the first position with respective poles 1–4, 2–5, and 3–6 interconnected being the normal, 12 volt output condition to charge the battery 27 as required and controlled by the regulator member 25. The relay terminal 81 of the alternator member 24 is connected by lines 75 and 71 to the relay terminal 68 on the regulator member 25. The armature terminal 82 of the alternator member 24 is connected by lines 76 and 60 to the battery 27. The field terminal 85 of the alternator member 24 is connected through line 89, current control assembly 33, line 106, voltage control assembly 31, line 78, poles 6–3, and line 70 to the field terminal 65 of the regulator member 25. This is the normal condition of power control by the combination of the alternator member 24 and the regulator member 25 in present day vehicles. Also, there is provided 12 volt D.C. output from pole 5 through coil member 119 and line 123 to the receptacle member 35.

In the second position of the master switch member 29 for generation of 90 volt D.C. power output, the poles 4–7, 5–8, and 6–9 are interconnected. In this condition, the relay terminal 81 in the alternator member 24 is open with the regulator member 25 now isolated from the power generating circuit. A 12 volt power supply is connected through the ignition switch 22 and line 73 to the pole 9. From the pole 6, power is through line 78, contact 105, contact lever 96, line 106, contact 107, contact lever 121, and line 89 to the field terminal 85 of the alternator member 24. The power output from the alternator member 24 is conveyed through the armature contact 82, line 76, pole 5, line 80, coil member 119, line 123, and fuse member 45 to the receptacle member 35.

A control voltage of 12 volts D.C. is always present at the field terminal 85 except during conditions of voltage and/or amperage overload. In this embodiment of the power output means 12, the voltage output may be adjusted between 80 – 110 volts D.C. but the preferred upper limit is set at 90 volts D.C. Similarly, the current control assembly 33 may control the current to 20 – 30 amperes, but in this embodiment is set at 25 amperes.

Now, on the voltage increasing above 90 volts D.C., the output from the alternator member 24 goes in line 101 and through resistor 103 and to the coil member 95. The excessive voltage opens the contact lever 96 and power is conveyed through the resistor 109 to the field terminal 85 on the armature member 24. This causes a momentary dropping of the field on the armature member 24 to return system to 90 volts D.C. output. The relay member 93 is a vibrating type so that the control action is continuous and a control voltage is present through the resistor 103 to the coil member 95. The resistor is of 250 ohm and 50 watt to drop the 90 volt D.C. to 12 volts D.C. to the coil member 95 under normal operating conditions.

In the condition of excessive amperage, the coil member 119 in the current control assembly 33 operates to open the contact lever 121 which again interrupts the flow to the field terminal 85 on the armature member 24. This action is continuous and quickly returns the power system to acceptable current output. The fuse member 45 further protects the system from damage to the tools using the receptacle member 35 from overload conditions.

It is noted that the relay members in the voltage control assembly and the current control assembly are of a vibrating reed type to act in micro seconds to continuously audit the system to maintain the proper voltage and current conditions.

The power output means of this invention provides a continuous control of power available at an output receptacle member to prevent damage to light fixtures, tools, etc. from high voltage and current conditions.

While the invention has been described in conjunction with preferred specific embodiments, thereof, it will be understood that this description is intended to illustrate and not to limit the scope of the invention, which is defined by the following claims.

I claim:

1. In a vehicle having a power driven alternator which has at least an armature output circuit, a field circuit, and a power supply, a high voltage output control apparatus comprising:
   a. a magnetically operated voltage control means having an operating voltage output terminal and an overvoltage output terminal;
   b. a magnetically operated current control means having an operating current limiting output terminal;
   c. means for passing current from said power supply to said magnetically operated voltage control means from said operating voltage output terminal to said magnetically operated current control means and to said field circuit of said alternator, and from said operating current limiting output terminal to said field circuit and from said overvoltage output terminal through a resistance means to said field circuit, and
   d. means for coupling said circuit through said magnetically operated current control means to an output receptacle.

2. An apparatus as described in claim 1 wherein said magnetically operated voltage control means comprises a relay having a coil, first and second contacts, a switched contact which will make either said first or second contact; means for mechanically operating said switched contact by energizing said coil; said first contact complete to said maximum voltage output terminal; said second contact complete to said overvoltage output terminal; said switched contact complete to said magnetically operated current control means; and, said coil complete across said armature circuit.

3. An apparatus as described in claim 2, wherein said current control means comprises a switch operated by a coil, and wherein said armature output circuit is coupled through said coil to said receptor.

4. An apparatus as described in claim 1 additionally including a light coupled across said resistance means.

5. An apparatus as described in claim 1, additionally including a master switch, having means to selectively couple said alternator output circuit operatively to said power supply and to a regulator in a first position, and said power supply to said current control means and said armature output circuit to said voltage control means in a second position.

6. In a vehicle having a power driven alternator which has at least an armature output circuit and a field circuit and a power supply, a high voltage output control apparatus comprising:
   a. a voltage control means having a control circuit means, an operating voltage output means and an overvoltage output means wherein a circuit will be completed through said operating voltage output means under normal operating condition and through said overvoltage output means during overvoltage conditions;
   b. a current control means having a control circuit means whereby a circuit is completed through said operating current control means under normal current conditions and interrupted under overcurrent condition;
   c. resistance means;
   d. means coupling said source of power through said operating voltage output means, to said field circuit, and to said overvoltage output means, through said operating voltage current and through said resistance means to said field circuit; and
   e. means for comply said armature circuit through said current control means to a receptacle means, and across said voltage control circuit means.

7. An apparatus as described in claim 6 wherein said magnetically operated voltage control means comprises a relay having a coil, first and second contacts, a switched contact which will make either said first or second contact; means for mechanically operating said switched contact by energizing said coil; said first contact complete to said maximum voltage output terminal; said second contact complete to said overvoltage output terminal; said switched contact complete to said magnetically operated current control means; and, said coil complete across said armature circuit.

8. An apparatus as described in claim 7, wherein said current control means comprises a switch operated by a coil, and wherein said armature output circuit is coupled through said coil to said receptor.

9. An apparatus as described in claim 6, additionally including a light coupled across said resistance means.

10. An apparatus as described in claim 6, additionally including a master switch, having means to selectively couple said alternator output circuit operatively to said power supply and to a regulator in a first position, and said power supply to said current control means and said armature output circuit to said voltage control means in a second position.

* * * * *